United States Patent
Sessa et al.

(10) Patent No.: US 7,047,452 B2
(45) Date of Patent: May 16, 2006

(54) METHOD AND SYSTEM FOR DETECTING EXCESSIVE USE OF A DATA PROCESSING SYSTEM

(75) Inventors: Valentina Sessa, Romas (IT); Pia Toro, Romas (IT)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/302,520

(22) Filed: Nov. 21, 2002

(65) Prior Publication Data

US 2004/0237002 A1 Nov. 25, 2004

(30) Foreign Application Priority Data

Dec. 11, 2001 (EP) .................................. 01480128

(51) Int. Cl.
*G06F 11/00* (2006.01)
(52) U.S. Cl. .......................... 714/47; 463/29; 702/176; 702/177; 702/178
(58) Field of Classification Search .................. 714/47; 702/176, 177, 178; 455/405; 463/29
See application file for complete search history.

(56) References Cited

U.S. PATENT DOCUMENTS

| 5,203,848 | A | * | 4/1993 | Wang ........................... 463/45 |
|---|---|---|---|---|
| 5,267,734 | A | * | 12/1993 | Stamper et al. ................ 463/23 |
| 5,305,238 | A | * | 4/1994 | Starr et al. .................... 702/176 |
| 5,654,905 | A | * | 8/1997 | Mulholland et al. ......... 702/186 |
| 5,964,661 | A | * | 10/1999 | Dodge ........................... 463/24 |
| 6,065,138 | A | * | 5/2000 | Gould et al. ................... 714/47 |
| 6,131,024 | A | * | 10/2000 | Boltz ........................... 455/405 |
| 6,489,947 | B1 | * | 12/2002 | Hesley et al. ................ 345/163 |
| 6,571,343 | B1 | * | 5/2003 | Johnson et al. ............. 713/340 |
| 6,722,984 | B1 | * | 4/2004 | Sweeney et al. ............ 341/176 |
| 2005/0078008 | A1 | * | 4/2005 | Cheng ...................... 340/573.1 |

OTHER PUBLICATIONS

Microsoft Press Computer Dictionary, 1997, Microsoft Press, Third Edition, p. 422.*

* cited by examiner

*Primary Examiner*—Robert Beausoliel
*Assistant Examiner*—Marc Duncan
(74) *Attorney, Agent, or Firm*—Stephen J. Walder, Jr.; Jeffrey S. LaBaw

(57) ABSTRACT

A method (300) for detecting excessive use of a data processing system, such as a computer or a video game, is disclosed. In a first embodiment of the invention, the method estimates (315 340, 365) the length of a period of continuous use of the system, typically a computer. When the estimated period reaches a pre-set threshold value, a warning is provided to the user (325, 345), in order to discourage he or she from looking at the monitor. In a different embodiment of the invention, the system (typically a video game) is disabled when its usage during the current day reaches a further pre-set threshold value. In this way, parents may limit the daily usage of video games by their children.

24 Claims, 4 Drawing Sheets

METHOD AND SYSTEM FOR DETECTING EXCESSIVE USE OF A DATA PROCESSING SYSTEM

The present invention relates to a method and system for detecting excessive use of a data processing system.

Scientific studies carried out in the last years have revealed the risks connected with an excessive use of data processing systems, such as computers and video games. For example, exposure to electromagnetic radiation generated by the cathode ray tube of a monitor may be harmful, particularly for the eyes. Moreover, incorrect use of a keyboard or a mouse for extended periods may bring about damages to the hands and the wrists. The adverse psychological impact on young boys and girls of the prolonged use of video games has been also the subject of scientific discussion.

The governments of some countries have recognised the above-mentioned risks, and they have enacted laws that impose resting breaks for people working daily for long periods in front of the monitor. However, the provisions of these laws are routinely not complied with, so that they are completely ineffective in preventing people from being adversely affected by the hazards deriving from the use of computers at work.

In any case, the widespread diffusion of computers and video games at home has raised growing concerns on the possible risks caused by their prolonged use during the spare time.

The inventors have discovered that there is a need for a technical solution that is effective in helping people avoid excessive use of data processing systems.

It is an object of the present invention to eliminate the above-mentioned shortcoming. In order to achieve this object, a method as set out in the first claim is proposed.

Briefly, the present invention provides a method of detecting excessive use of a data processing system including the steps of determining an activity value indicative of a length of a period of use of the system defined according to a pre-set criterion, comparing the activity value with a threshold value, and warning a user of the system when the activity value reaches the threshold value.

The present invention also provides a computer program for performing the method, a program product storing the program, and a corresponding data processing system.

Further features and the advantages of the solution according to the present invention will be made clear by the following description of a preferred embodiment thereof, given purely by way of a non-restrictive indication, with reference to the attached figures, in which.

Figure 1:
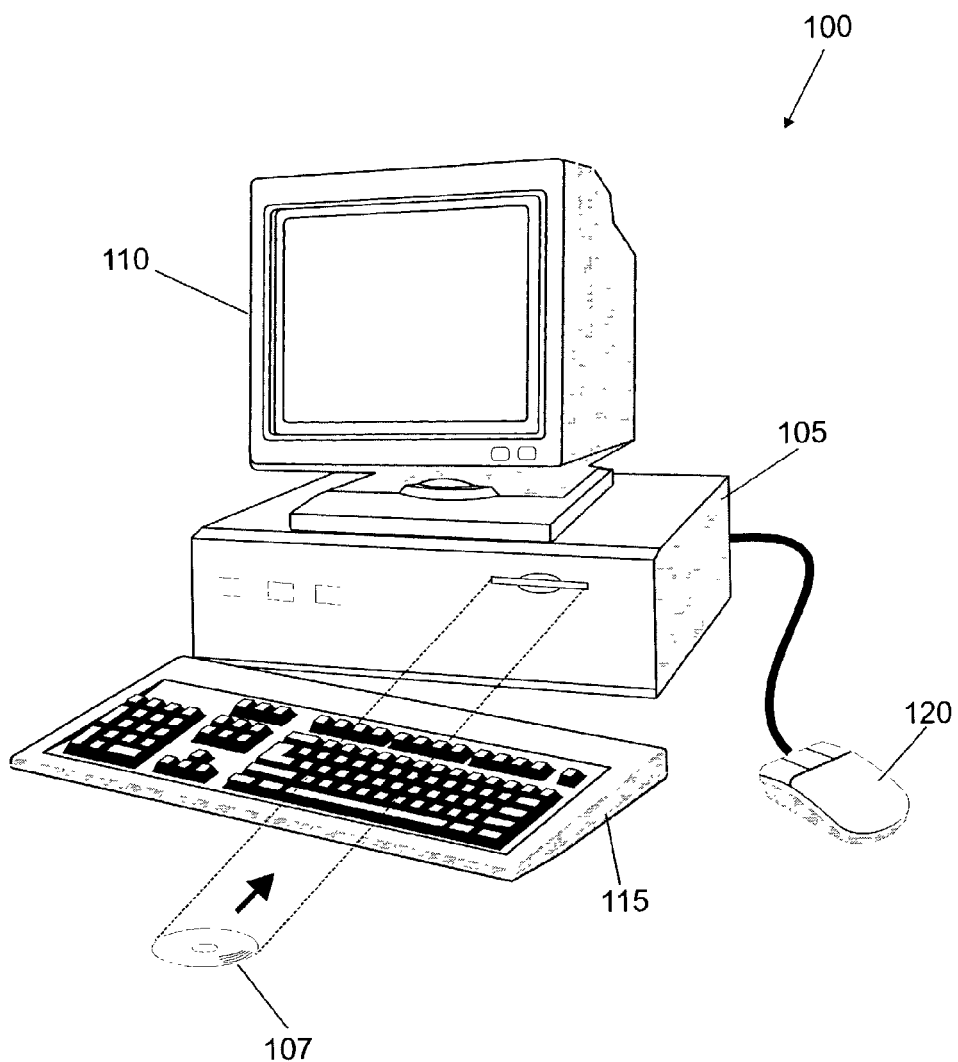
FIG. 1 is a pictorial representation of a computer in which the method of the invention can be used.

With reference in particular to FIG. 1, a Personal Computer (PC) 100 is shown. The computer 100 consists of a central unit 105, which houses the electronic circuits controlling its operation (such as a microprocessor and a working memory), in addition to a hard-disk and a driver for CD-ROMs 107. A monitor 110 is connected to the central unit 105 in a conventional manner. The computer 100 further includes a keyboard 115 and a mouse 120, which are used to enter data or commands and to manipulate the position of a pointer (not shown in the figure) on the monitor 110.

Similar considerations apply if the computer has a different structure or includes different units (for example a printer), if the monitor is replaced by an equivalent video unit, if other input units are employed (such as a joystick), and the like. Alternatively, the method of the invention is used in a workstation, in a device for video games, or in any other data processing system.

Figure 2:
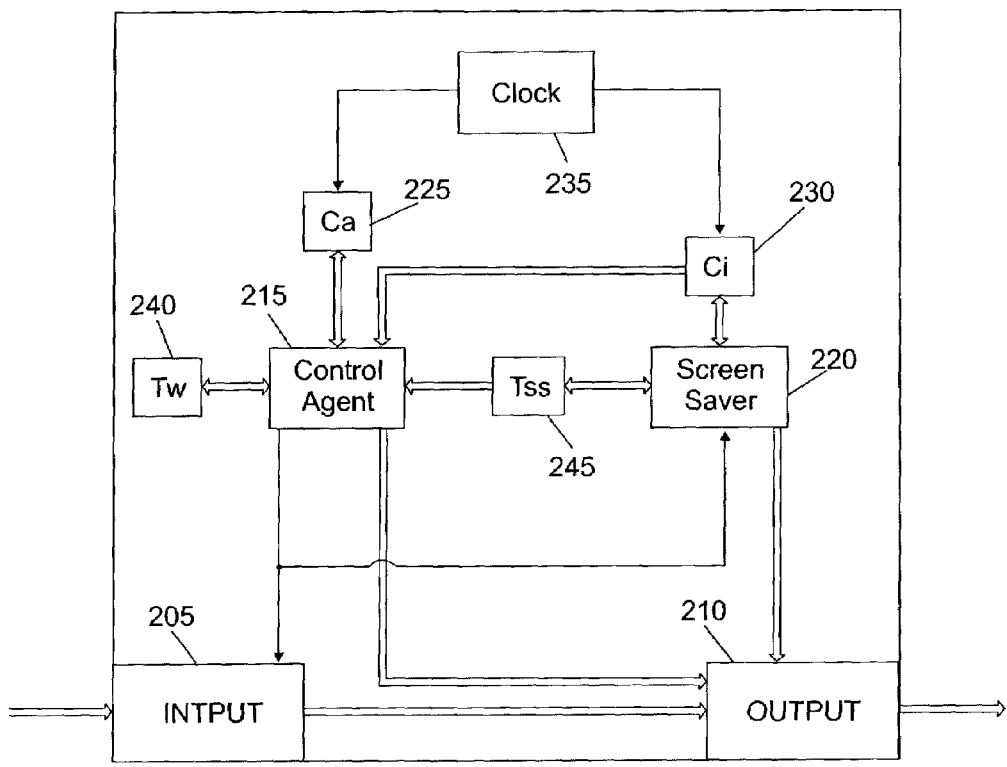
FIG. 2 shows a partial content of a working memory of the computer.

Considering now FIG. 2, a partial content of the working memory of the computer in operation is shown; the information (programs and data) is typically stored on the hard-disk and loaded (at least partially) into the working memory when the programs are running, together with an operating system and other application programs (not shown in the figure). The programs are initially installed onto the hard disk from CD-ROM.

An input interface 205 is used to enter data and/or commands (with the keyboard and the mouse) by a user of the computer; the input interface 205 drives an output buffer 210 for the monitor of the computer.

The input interface notifies occurrence of any user input (such as a keystroke or a movement of the mouse) to a control agent 215 and to a screen-saver 220, which are running continuously in the background. The control agent 215 causes a warning message to be displayed on the monitor, in order to prevent excessive use of the computer; the screen-saver 220 takes over the monitor (either blanking out the monitor entirely or displaying a constantly moving image) if there is no user input for a long period.

An activity counter 225 and an inactivity counter 230 measure a period of use (Ca) and a period of non-use (Ci), respectively, of the computer. The activity counter 225 and the inactivity counter 230 are incremented by a clock signal received from a corresponding module 235 (for example every second). The activity counter 225 is accessed and reset by the control agent 215; the inactivity counter 230 is accessed by both the control agent 215 and the screen saver 220, and it is reset by the screen-saver 220. The control agent 215 further manages a variable 240 storing a warning threshold value (Tw), which defines the maximum desired time of consecutive use of the computer (for example two hours). A screen-saver threshold value (Tss), which defines the length of the period of non-use of the computer triggering the screen saver 220 (for example 15 minutes), is stored in a variable 245; the variable 245 is controlled by the screen-saver 220, and it is also accessed by the control agent 215.

Similar considerations apply if the programs and data are structured in a different manner, if other modules or functions are provided, if the warning threshold value and the screen-saver threshold value are different, if the counters are incremented with a different frequency, and the like. Alternatively, different screen-saver threshold values are provided for a series of user profiles; for example, the threshold is set to a low value (such as 5 minutes) when the user is supposed to perform very interactive activities (for example data entry), and it is set to a high value (such as 30 minutes) when the user is supposed to perform scarcely interactive activities (for example reading an electronic book). Moreover, the current screen-saver threshold value is dynamically adjusted according to the user behaviour; particularly, the threshold is incremented (for example of 1 minute) every time the screen-saver is removed just after it has been activated (indicating that the computer was actually in use).

Figure 3:
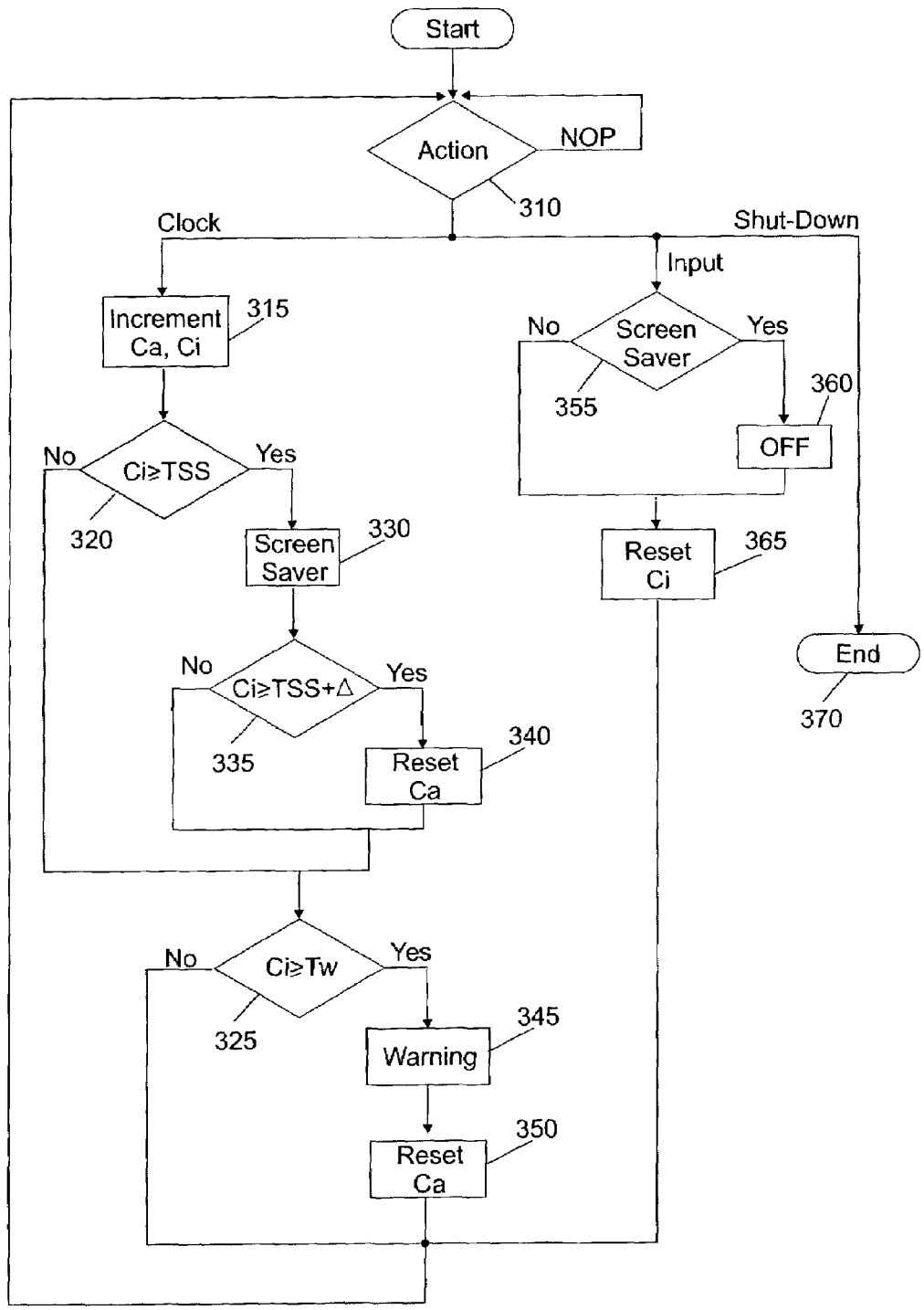
FIG. 3 and FIG. 4 are flow charts describing the logic of different embodiments of the invention.

Moving to FIG. 3, a method 300 is performed on the computer when turned on (it should be noted that the method is described with a flow chart for the sake of simplicity, although it typically consists of several concurrent processes that are executed in parallel).

The method starts at block 305 and then enters an idle loop at block 310, waiting for an event to occur. The method carries out different operations responsive to the event occurred. Particularly, if a clock signal is received the blocks 315–350 are executed, whereas if a user input is detected the blocks 355–365 are executed; in both cases, the method then returns to block 310. Conversely, if the computer has been shut down, the method ends at the final block 370.

In detail, the (content of the) activity counter Ca and the (content of the) inactivity counter Ci are incremented in response to the clock signal at block 315. The method then verifies at block 320 whether the inactivity counter Ci has reached the screen-saver threshold value Tss. If not, the method descends into block 325 (described in the following). Conversely, the screen-saver is activated at block 330 (if not already active). The method then verifies at block 335 whether the inactivity counter Ci exceeds the screen-saver threshold value Tss of a pre-set Δ value (for example 5 seconds). If so, the activity counter Ca is reset at block 340, and the method then continues to block 325. Conversely, the method descends into block 325 directly.

Considering now block 325, a test is made to determine whether the activity counter Ca has reached the warning threshold value Tw. If not, the method returns to block 310. On the contrary, a pop-up window is displayed on the monitor at block 345; the pop-up window contains a warning message that encourages the user to take a rest. Continuing to block 350, the activity counter Ca is reset; the method then returns to block 310.

Referring back to block 310, when the user performs any action (for example pressing a key of the keyboard or moving the mouse), the method verifies at block 355 whether the screen-saver is active. If so, the screen-saver is removed at block 360, and the method then proceeds to block 365; conversely, the method descends into block 365 directly. Referring now to block 365, the inactivity counter Ci is reset. The method then returns to block 310.

Figure 4:
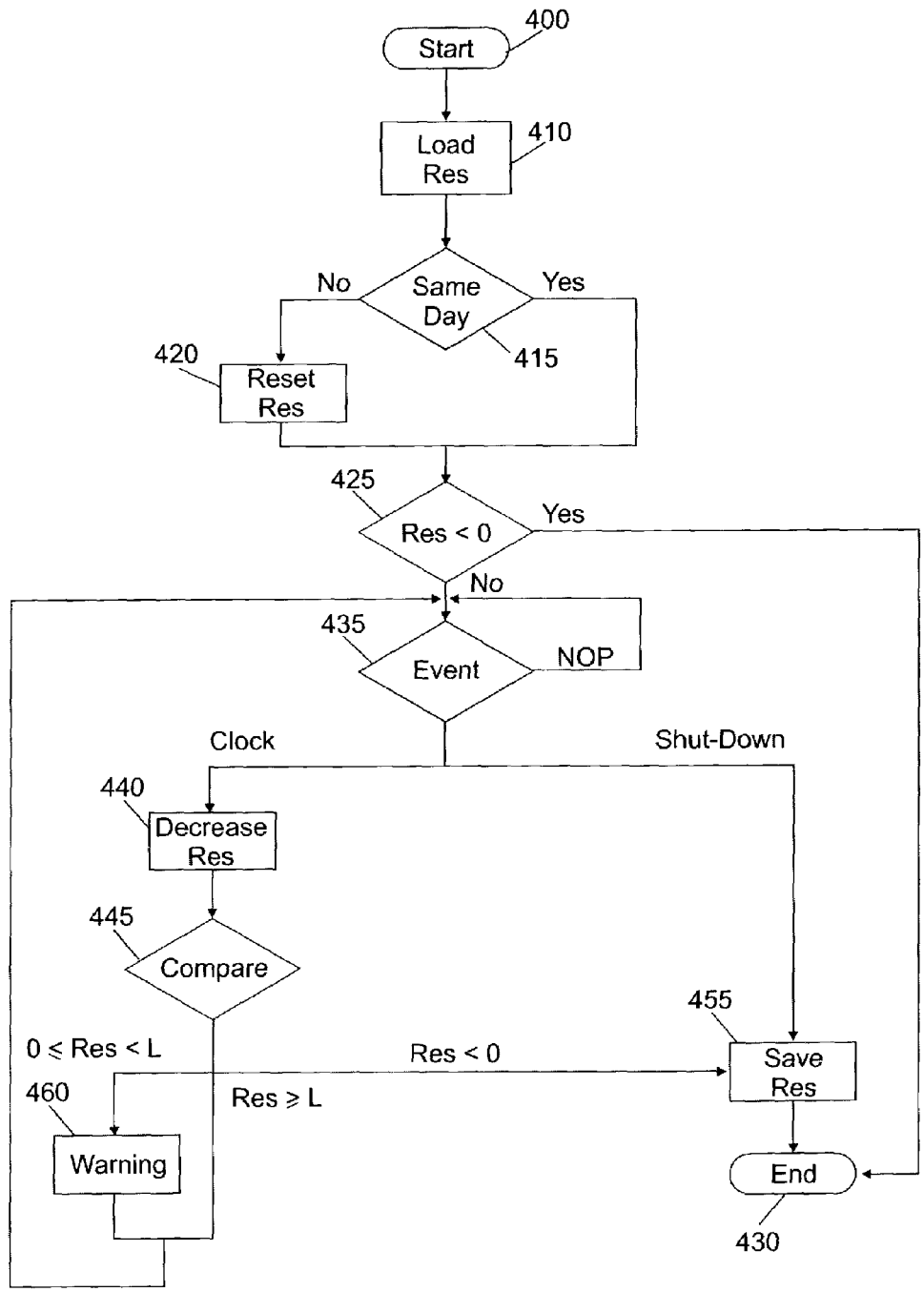

In an alternative embodiment of the present invention, as shown in FIG. 4, a different method 400 is performed. The method starts at block 405 and then passes to block 410, wherein a timer measuring a residual period of use (Res) for the computer is loaded from the hard-disk. A time stamp stored on the hard-disk together with the timer Res is compared at block 415 with the current day (provided by an internal clock of the computer). If the timer Res had been saved during a previous day, it is restored at block 420 to a starting value defining the maximum (total) time of use of the computer allowed every day (for example three hours); the method then continues to block 425. Conversely, the method descends into block 425 directly. A test is made in decision block 425 to determine whether the timer Res has fallen below zero. If so, the method ends at the final block 430, in order to prevent starting of the computer; on the contrary, the method enters an idle loop at block 435, waiting for an event to occur.

Particularly, if a clock signal is received the timer Res is decreased at block 440. The value of the timer Res is then checked at block 445. If the timer Res is approaching the zero (that is, if $0 \leq Res < L$ with for example L=5 minutes), a pop-up window warning the user that the computer will be shut down in a few minutes is displayed on the monitor at block 450; the method then returns to block 435. On the other hand, if the timer Res has fallen below zero, the timer Res is saved on the hard disk (together with the current time) at block 455 and the method then ends at the final block 430. Otherwise (that is, if $Res \geq L$), the method returns to block 435 directly.

Referring back to block 435, if the computer has been shut down the timer Res is saved on the hard disk at block 455, and the method then ends at the final block 430.

Similar considerations apply if equivalent methods are performed, if the pop-up windows are replaced with different warnings (for example consisting of acoustic or visible signals), if operation of the computer is disabled for a pre-set period of time (for example 15 minutes) when the activity counter reaches the warning threshold value, if configuration options are available (preferably protected by a password) for customising parameters of the system (such as the threshold values and the starting value for the timer), if the total time of use of the computer is measured in a different period (such as weekly), and the like. Alternatively, a further warning is provided to the user when a pre-set (total) resting period (for example 15 minutes) is not observed periodically (for example every two hours); in this case, the resting period is estimated summing up the periods during which the screen-saver is active with a half of each respective screen-saver threshold value.

More generally, the present invention provides a method of detecting excessive use of a data processing system. The method starts with the step of determining an activity value indicative of a length of a period of use of the system, which is defined according to a pre-set criterion. The activity value is compared with a threshold value. A user of the system is warned when the activity value reaches the threshold value.

The solution of the invention discourages people from excessively using data processing systems, such as computers and video games. The proposed method is effective in preventing potential risks deriving from exposure to electromagnetic radiation or from incorrect use of the keyboard and the mouse. Moreover, the envisaged solution may be used for reducing the psychological impact caused by the prolonged use of video games on young boys and girls.

The invention provides a tool that automatically warns the user after a certain period (defined according to a pre-set criterion) has lapsed. In this way, compliance with recommended conditions of use of the system is strongly facilitated.

The effectiveness of the proposed method is excellent in any situation, either at work or at home.

The preferred embodiment of the invention described above offers further advantages.

Particularly, the activity counter is indicative of a substantially consecutive period of use of the system.

This feature is particularly advantageous in computers used at work; for example, the proposed solution is effective in preventing hazards caused by continuous usage of the computer by people daily working in front of the monitor.

Preferably, the period of use of the computer is estimated by means of an activity counter and an inactivity counter.

The proposed algorithm makes it possible to take into consideration even periods during which the user is not performing any action but he/she is using the computer; for example, the activity counter is reset only when no user input is detected for a period set to the one usually needed to read an e-mail or a page of a document.

Alternatively, the activity value is defined in a different manner (for example as the length of a period of use of the computer without any break of a minimum duration), or the activity value is determined in a different manner (for example simply measuring when the computer is on), and so on.

Advantageously, the activity counter is reset after activation of the screen-saver.

In this way, the proposed tool may be integrated with another tool commonly available on any computer; moreover, operation of both tools may be tuned at the same time (for example according to the user behaviour).

As a further enhancement, the activity counter is reset only after a pre-set period from the activation of the screen-saver.

The envisaged solution makes it possible to take into consideration periods during which the user is performing scarcely interactive activities (such as analyses of complex reports), which may cause undesired activation of the screen-saver that is promptly removed by the user.

However, the solution of the invention leads itself to be implemented resetting the activity counter at the same time when the screen-saver is activated, resetting the activity counter independently of the operation of the screen-saver, or even in a computer without any screen-saver.

In a different embodiment of the invention, the activity value is indicative of a length of a total period of use of the system during the day (or an equivalent measuring period).

This feature is effective in preventing excessive use of video games or of the INTERNET.

Preferably, operation of the system is disabled until the end of the day when the activity value reaches the threshold value.

The proposed solution makes it possible for parents to limit the daily usage of video games or of the INTERNET by their children (even when the children are alone at home).

However, the method of the invention is also suitable to be implemented disabling operation of the system only for a pre-set period (for example 1 hour), or even simply providing a warning to the user when the activity value reaches the threshold value.

Advantageously, the solution according to the present invention is implemented with a computer program (software), which is provided on CD-ROM.

Alternatively, the program is provided on floppy-disk, is pre-loaded onto the hard-disk, or is stored on any other computer readable medium, is sent to the system through a network (typically the INTERNET), is broadcast, or more generally is provided in any other form directly loadable into a working memory of the system. However, the method according to the present invention leads itself to be carried out even with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

The invention claimed is:

1. A method, in a data processing system, of detecting excessive use of the data processing system comprising the steps of:
   determining an activity value indicative of a total time of use, by a user, of the system defined according to a pre-set criterion during a pre-set measuring period;
   comparing the activity value with a threshold value, wherein the threshold value identifies a maximum amount of total time of activity of the data processing system permissible during the pre-set measuring period;
   storing, in response to a user discontinuing use of the data processing system, a current value of the activity value along with a timestamp in a storage device associated with the data processing system;
   in response to a user continuing use of the data processing system, determining, based on the timestamp, whether a current time is within a pre-set measuring period associated with the timestamp;
   starting incrementing of the activity value from its current value stored in the storage device, if the current time is within the pre-set measuring period associated with the timestamp; and
   warning the user of the data processing system when the activity value reaches the threshold value.

2. The method according to claim 1, wherein the activity value is indicative of a length of a substantially consecutive period of use of the data processing system.

3. The method according to claim 2, wherein the step of determining the activity value includes:
   incrementing the activity value, and an inactivity value indicative of a length of a period of non-use of the data processing system, in response to a clock signal;
   resetting the activity value when the inactivity value reaches a further threshold value; and
   resetting the inactivity value in response to a user input.

4. The method according to claim 3, further including the step of activating a screen-saver for a video unit of the data processing system when the inactivity value reaches a still further threshold value, the still further threshold value being not greater than the further threshold value.

5. The method according to claim 4, wherein the still further threshold value is lower than the further threshold value.

6. The method according to claim 1, further including the step of disabling operation of the data processing system until the end of the measuring period when the activity value reaches the threshold value.

7. The method of claim 1, wherein the pre-set measuring period is at least one day, and wherein determining whether the current time is within a pre-set measuring period associated with the timestamp comprises determining if the current time is within a same period of at least one day as the timestamp.

8. The method of claim 1, further comprising:
   dynamically modifying the threshold value in response to a user's use of the data processing system.

9. The method of claim 8, wherein dynamically modifying the threshold value in response to a user's use of the data processing system comprises:
   determining if the user deactivates a screensaver within a predetermined period after activation of the screen-saver; and
   adjusting the threshold value if the user deactivates the screensaver within the predetermined period of time after activation of the screensaver.

10. The data processing system of claim 8, wherein the means for dynamically modifying the threshold value in response to a user's use of the data processing system comprises:
    means for determining if the user deactivates a screen-saver within a predetermined period after activation of the screensaver; and
    means for adjusting the threshold value if the user deactivates the screensaver within the predetermined period of time after activation of the screensaver.

11. The method of claim 1, further comprising resetting the activity value to an initial value if the current time is not within the pre-set measuring period associated with the timestamp.

12. A data processing system comprising:
- means for determining an activity value indicative of a total time of use, by a user, of the system defined according to a pre-set criterion during a pre-set measuring period;
- means for comparing the activity value with a threshold value, wherein the threshold value identifies a maximum amount of total time of activity of the data processing system permissible during the pre-set measuring period;
- means for storing, in response to a user discontinuing use of the data processing system, a current value of the activity value along with a timestamp in a storage device associated with the data processing system;
- means for determining, in response to a user continuing use of the data processing system, based on the timestamp, whether a current time is within a pre-set measuring period associated with the timestamp;
- means for starting incrementing of the activity value from its current value stored in the storage device, if the current time is within the pre-set measuring period associated with the timestamp; and
- means for warning a user of the system when the activity value reaches the threshold value.

13. The data processing system according to claim 12, wherein the activity value is indicative of a length of a substantially consecutive period of use of the data processing system.

14. The data processing system according to claim 13, wherein the means for determining the activity value further comprises:
- means for incrementing the activity value and an inactivity value indicative of a length of a period of non-use of the data processing system in response to a clock signal;
- means for resetting the activity value when the inactivity value reaches a further threshold value; and
- means for resetting the inactivity value in response to a user input.

15. The data processing system according to claim 12, further including the means for disabling operation of the data processing system until the end of the measuring period when the activity value reaches the threshold value.

16. The data processing system of claim 12, wherein the pre-set measuring period is at least one day, and wherein the means for determining whether the current time is within a pre-set measuring period associated with the timestamp comprises means for determining if the current time is within a same period of at least one day as the timestamp.

17. The data processing system of claim 12, further comprising:
- means for dynamically modifying the threshold value in response to a user's use of the data processing system.

18. A computer program product in a computer readable medium for a data processing system comprising:
- means for determining an activity value indicative of a total time of use, by a user, of the system defined according to a pre-set criterion during a pre-set measuring period;
- means for comparing the activity value with a threshold value, wherein the threshold value identifies a maximum amount of total time of activity of the data processing system permissible during the pre-set measuring period;
- means for storing, in response to a user discontinuing use of the data processing system, a current value of the activity value along with a timestamp in a storage device associated with the data processing system;
- means for determining, in response to a user continuing use of the data processing system, based on the timestamp, whether a current time is within a pre-set measuring period associated with the timestamp;
- means for starting incrementing of the activity value from its current value stored in the storage device, if the current time is within the pre-set measuring period associated with the timestamp; and
- means for warning a user of the system when the activity value reaches the threshold value.

19. The computer program product according to claim 18, wherein the activity value is indicative of a length of a substantially consecutive period of use of the data processing system.

20. The computer program product according to claim 19, wherein the means for determining the activity value further comprises:
- means for incrementing the activity value and an inactivity value indicative of a length of a period of non-use of the data processing system in response to a clock signal;
- means for resetting the activity value when the inactivity value reaches a further threshold value; and
- means for resetting the inactivity value in response to a user input.

21. The computer program product according to claim 18, further comprising means for disabling operation of the data processing system until the end of the measuring period when the activity value reaches the threshold value.

22. The computer program product of claim 18, wherein the pre-set measuring period is at least one day, and wherein the means for determining whether the current time is within a pre-set measuring period associated with the timestamp comprises means for determining if the current time is within a same period of at least one day as the timestamp.

23. The computer program product of claim 18, further comprising:
- means for dynamically modifying the threshold value in response to a user's use of the data processing system.

24. The computer program product of claim 23, wherein the means for dynamically modifying the threshold value in response to a user's use of the data processing system comprises:
- means for determining if the user deactivates a screensaver within a predetermined period after activation of the screensaver; and
- means for adjusting the threshold value if the user deactivates the screensaver within the predetermined period of time after activation of the screensaver.

* * * * *